United States Patent
Gray

[11] 4,030,612
[45] June 21, 1977

[54] PALLET RACKS

[76] Inventor: Robert Gray, c/o Bay Products Division, American Metal Works, Inc., 8701 Torresdale Ave., Philadelphia, Pa. 19136

[22] Filed: June 3, 1976

[21] Appl. No.: 692,424

[52] U.S. Cl. .............................. 211/192; 108/107; 211/182; 403/49; 403/230; 403/321
[51] Int. Cl.² .......................................... A47F 5/10
[58] Field of Search .......... 211/192, 186, 187, 191, 211/182, 201; 108/106, 107, 109; 248/224; 52/758 R, 645, 646, 655; 403/245, 230, 49, 324, 321

[56] References Cited
UNITED STATES PATENTS

| 2,665,950 | 1/1954 | Johnson | 403/49 X |
| 2,845,307 | 7/1958 | Holmes | 403/49 |
| 3,127,995 | 4/1964 | Mosinski | 52/758 R X |
| 3,154,833 | 11/1964 | Kimball | 211/186 X |
| 3,237,779 | 3/1966 | Eger | 403/230 X |
| 3,346,124 | 10/1967 | Sobel | 211/187 X |

FOREIGN PATENTS OR APPLICATIONS 901,351  7/1962  United Kingdom ................. 403/49

Primary Examiner—Roy D. Frazier
Assistant Examiner—Robert W. Gibson, Jr.
Attorney, Agent, or Firm—Z. T. Wobensmith, 2nd; Z. T. Wobensmith, III

[57] ABSTRACT

A pallet rack is disclosed which is collapsible for storage and shipment, can be readily varied as to size, requires minimal hardware, with four corner uprights connected at the front and at the rear by pairs of beams at the same level, the uprights at each end being connected horizontally and diagonally by struts which are detachably connected at their ends by readily releasable locking mechanism which includes rods welded to the corner uprights and a slidable box cammed for application to a rod and with a holding bolt which may be readily tightened or loosened as desired.

12 Claims, 5 Drawing Figures

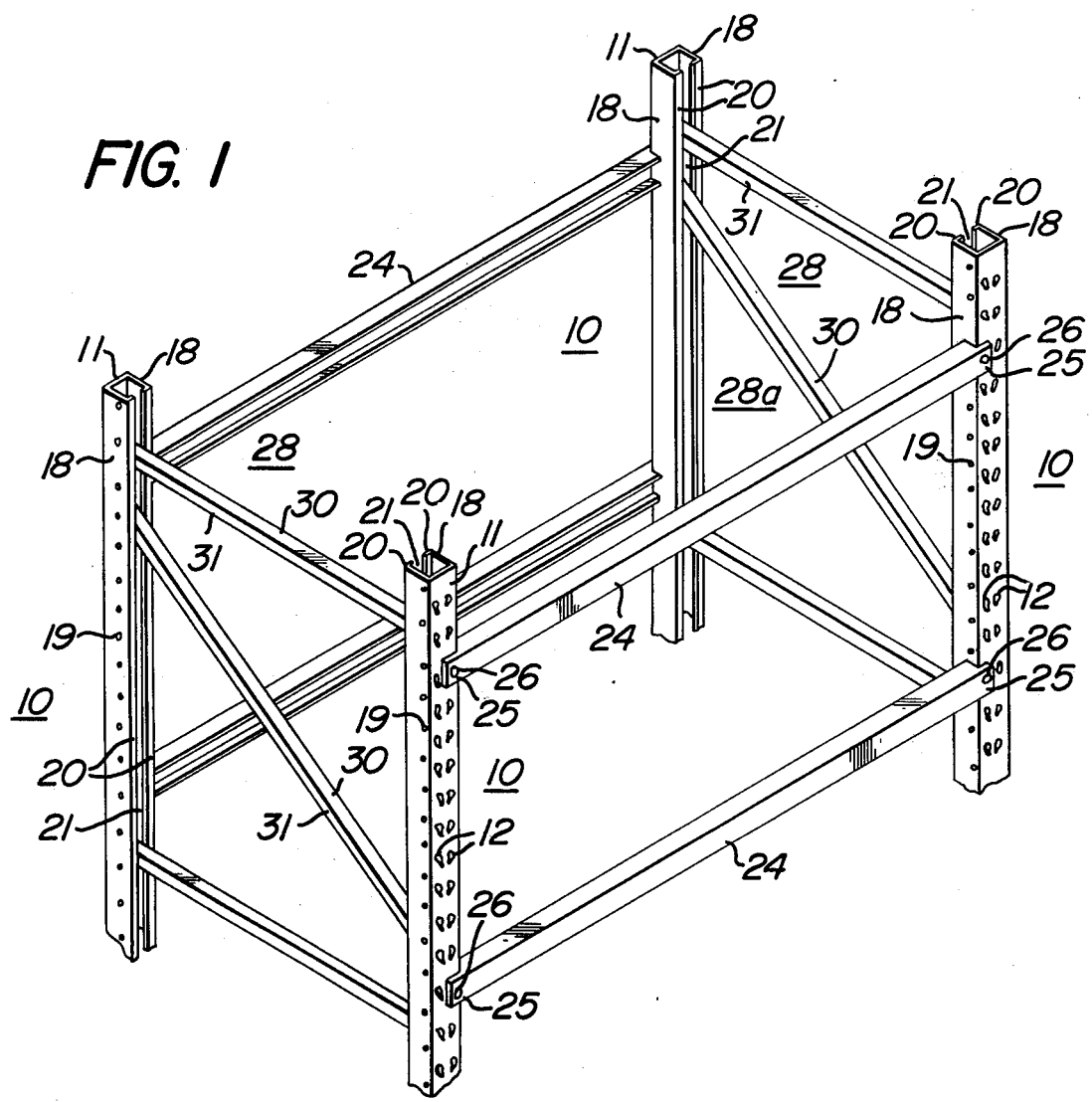

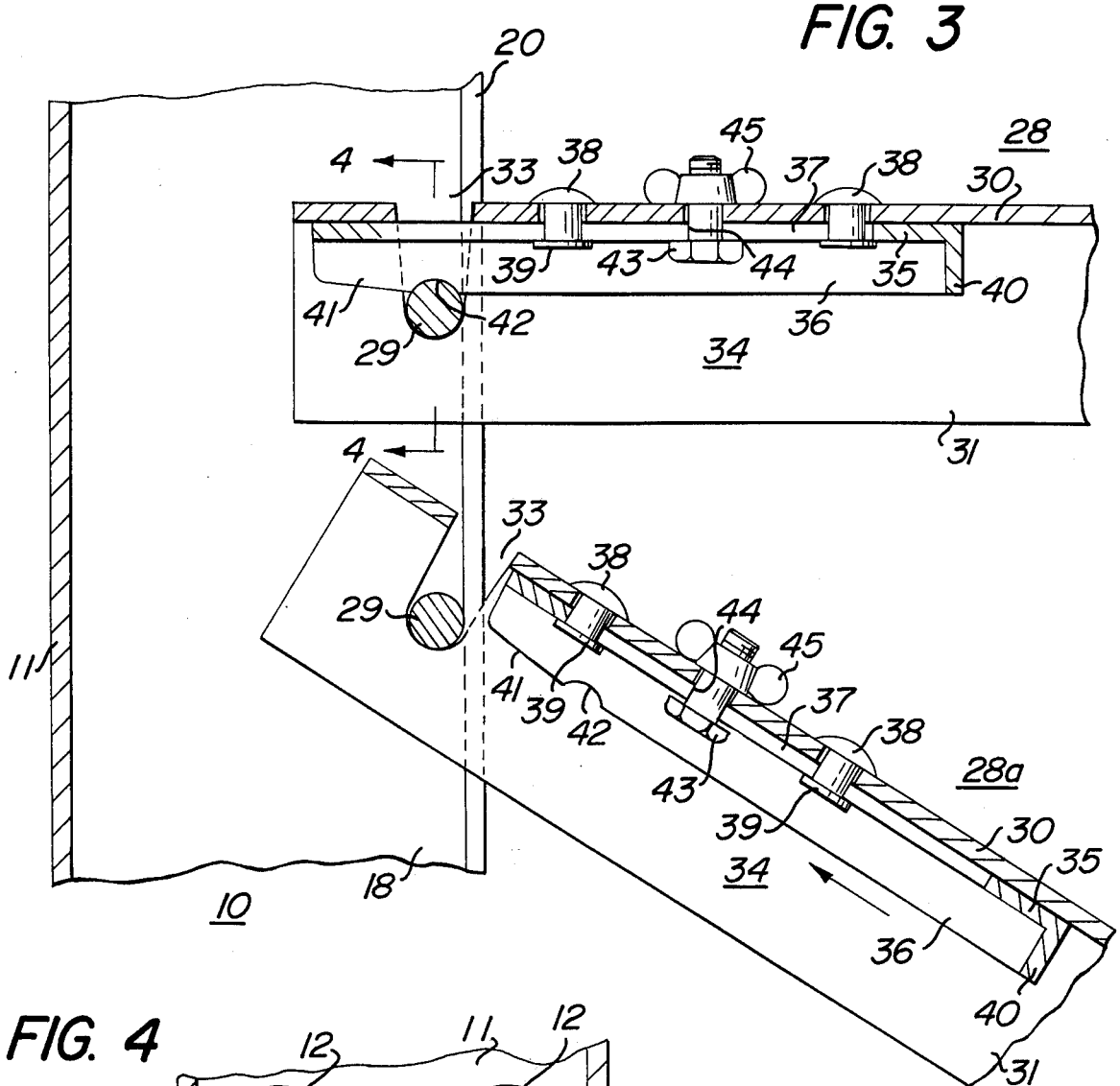
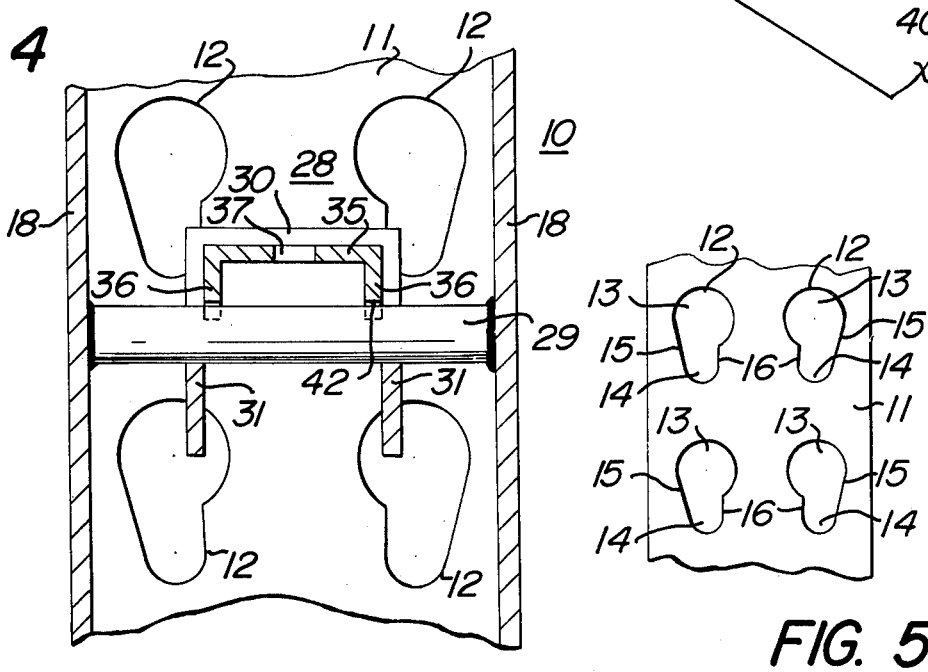

PALLET RACKS

BACKGROUND OF THE INVENTION

1. Field of the Invention

This invention relates to racks and more particularly to a rack which is especially suited for but not limited to storage of pallets.

2. Description of the Prior Art

It has heretofore been proposed to provide racks for the storage of pallets but the structures heretofore available were lacking in strength, were not designed for collapsibility for storage and shipping, required complex and expensive connections of the components, could not be readily varied as to size to accommodate different sizes of pallets or had other shortcomings.

SUMMARY OF THE INVENTION

In accordance with the invention a rack is provided which is particularly suited for storage of pallets, which is collapsible for storage and shipment, which can be readily varied as to size, which requires minimal hardware, and which includes four corner uprights connected at the front and rear by pairs of beams at desired levels, the uprights at each end being connected horizontally and diagonally by struts which are detachably connected at their ends by readily releasable locking mechanisms which includes rods welded to the corner uprights and a slidable box cammed for application to a rod and with a holding bolt which may be readily tightened or loosened as desired.

It is the principal object of the invention to provide a rack which is particularly suited for the storage of pallets and other objects and which is strong with rigid ends.

It is a further object of the invention to provide a rack of the character aforesaid which is assembled from component parts that can be readily shipped in knock down condition.

It is a further object of the invention to provide a rack of the character aforesaid in which a small number of components is required and the components are simple in construction so as to reduce the cost of manufacture.

It is a further object of the invention to provide a rack having a simple but effective locking construction for the ends of struts forming components of the rack.

Other objects and advantageous features of the invention will be apparent from the description and claims.

BRIEF DESCRIPTION OF THE DRAWINGS

The nature and characteristics features of the invention will be more readily understood from the following description taken in connection with the accompanying drawings forming part hereof, in which:

FIG. 1 is a view in perspective of a rack in accordance with the invention;

FIG. 2 is an enlarged fragmentary top plan view as seen from one of the rear corners and showing the connection of a strut to one of the corner uprights;

FIG. 3 is a vertical sectional view taken approximately on the line 3—3 of FIG. 2;

FIG. 4 is a vertical sectional view taken approximately on the line 4—4 of FIG. 3; and FIG. 5 is a fragmentary view in elevation showing a portion of one of the uprights.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings the rack in accordance with the invention, and as shown particularly in FIG. 1, includes four corner uprights 10 of hollow box construction, prefereaby formed of sheet metal, such as cold rolled steel, and of suitable gage.

The uprights 10 each has a wall 11 which serves as a front or rear wall depending upon its location and which has a plurality of vertical rows of holes 12 therein. The holes 12 can be any preferred shape but as illustrated in FIG. 5 have a modified keyhole shape with an upper circular opening 13, and a lower connected smaller circular opening 14, the opening 14 having a slight inward horizontal offset of its center with respect to the center of the opening 13, the openings 13 and 14 having a tangential connection 15 on the outer side and a tangential-chordal connection 16 on the inner side.

The uprights 10 each has parallel walls 18 extending from the wall 11 each with a row of holes 19 for connection of adjoinging racks by bolts (not shown) if desired.

The walls 18 have rims 20 extending therefrom parallel to the wall 11 and extending toward each other with a space 21 therebetween.

The uprights 10 at the desired levels and at the front and rear are connected by beams 24 which are preferably block C-shape in cross section, have end portions abutting the walls 18 and have end extensions 25. The extensions 25 are preferably secured by rivets 26 secured to end extension 25 passing through holes 12 in the walls 11.

Horizontal struts 28 and diagonal struts 28a are provided, preferably each of inverted block U-shape in cross section and of the required lengths in accordance with the spacing from front to rear of the uprights 10.

At the locations on the uprights 10 where it is desired to attach the struts 28 and 28a, a horizontal rod 29, preferably circular in cross section is secured to the upright 10, and advantageously to the inner faces of the rims 20 and in bridging relation to the space 21.

Each of the struts 28 or 28a has an upper wall portion 30 and parallel side walls 31. Each of the struts 28 and 28a, at each end has a slot 33 extending through the upper wall portion 30 and downwardly through the side walls 31. The struts 28 and 28a upon insertion through the spaces 21 are adapted for engagement of a rod 29 in the slot 33.

The rods 29 at the ends of the struts 28 and 28a are held in engagement in the slots 33 by a sliding locking box 34.

The box 34 has an upper wall portion 35 and side wall portions 36 slidable along the interiors of the struts 28 and 28a. Wall portion 30 and 31 are slidably supported by rivets 38 extending through an elongated slot 37 in the wall portion 30 with end rims 39 engaging the inner face of the wall portion 35 outside the slot 37.

At the end of the box 34 remote from the rod 29 an end wall 40 is provided for impact with a hammer for assembly or disassembly as hereinafter referred to.

The side walls 36 on each side are provided with inclined wedging or camming surfaces 41 and an arcuate holding surface 42 to aid in initiating and obtaining the desired holding action. A bolt 43 with its shank extending through an opening 44 in the wall 30 and through the slot 37 and has a wing nut 45 thereon for tightening when the box 34 is in its clamping position.

The manner of locking and holding the ends of the struts 28 and 28a is illustrated particularly in FIG. 3. The diagonal strut 28a is shown with the slot 33 having the rod 29 seated therein. The locking box 34 is advanced upwardly by impact of a hammer against the outer face of the wall 40. The box 34 is moved so that the wedging or camming surfaces 41 are moved along the rod 29 until the surface 42 is engaged with the rod 29 as shown for the strut 28 at the upper part of FIG. 3.

The end of the strut 28 or 28a is firmly held in place. As a matter of greater safety the wing nut 45 can be tightened.

The ends of the struts 28 and 28a may be detached by a reversal of the operations just described. The wing nut 45 is loosened, and the box 34 moved to disengage the rod 29 by hammer impact on the wall 40.

The structure heretofore described provides a strong rack, which can be readily assembled and disassembled with adaptability to various size requirements.

I claim:

1. A rack comprising
front and rear corner uprights, parallel horizontal beams respectively connecting front uprights and parallel horizontal beams respectively connecting rear uprights,
said corner uprights have fixed horizontal members in the interiors thereof at selected locations,
struts of inverted block U-shape extending between front and rear uprights at each end, and
means for detachably connecting the ends of said struts to said fixed horizontal members,
said struts as part of said last mentioned means having slots are their ends for reception of said horizontal members, and
slidable members interiorly disposed with respect to said struts and guided by said struts for retaining said horizontal members in said slots.

2. A rack as defined in claim 1 in which
certain of said horizontal beams are disposed at the same level.

3. A rack as defined in claim 1 in which
certain of said struts are horizontally disposed.

4. A rack as defined in claim 1 in which
at least one of said struts is diagonally disposed.

5. A rack as defined in claim 1 in which
said slidable member has an end abutment for impact to move said slidable member to and from a locking position.

6. A rack as defined in claim 1 in which
additional holding means is provided for retaining said slidable member in a locked position.

7. A rack as defined in claim 1 in which
said slidable members each has a locking surface for engagement with said horizontal members.

8. A rack as defined in claim 7 in which
said horizontal members are rods, and
said locking surface is arcuate for engagement with one of said rods.

9. A rack as defined in claim 7 in which
an inclined cam surface is provided for engagement with a horizontal member in advance of said locking surface.

10. A rack as defined in claim 1 in which
said slidable members have side walls with surfaces for engagement with said horizontal members.

11. A rack as defined in claim 10 in which
said surfaces include an inclined cam surface and a locking surface.

12. A rack as defined in claim 10 in which
said surfaces include an inclined cam surface and a locking surface, and
said slidable member has an end abutment for impact to move said slidable member to and from a locking position.

* * * * *